United States Patent [19]
Brehm et al.

[11] Patent Number: 5,372,625
[45] Date of Patent: Dec. 13, 1994

[54] METHOD OF MANUFACTURING A MULTIFERRULE FOR OPTICAL FIBERS

[75] Inventors: Claude Brehm, Montrouge; Jean-Pierre Dumas, Villemoisson sur-Orge; Philippe DuPont, Melun, all of France

[73] Assignee: Mars Actel, Vrigne aux Bois, France

[21] Appl. No.: 73,058

[22] Filed: Jun. 8, 1993

[30] Foreign Application Priority Data

Jun. 9, 1992 [FR] France .................. 92 06919

[51] Int. Cl.$^5$ .................................. C03B 37/028
[52] U.S. Cl. .............................. 65/409; 65/410; 385/22; 385/46
[58] Field of Search .............. 65/3.11, 4.2, 4.21, 65/18.1, 18.4; 385/22, 46

[56] References Cited

U.S. PATENT DOCUMENTS

| | | | |
|---|---|---|---|
| 2,311,704 | 2/1943 | Simison | 65/4.21 X |
| 3,563,716 | 2/1971 | Li | 65/4.21 |
| 3,677,730 | 7/1972 | Deradoorian et al. | |
| 3,805,735 | 4/1974 | Reuschel et al. | 65/4.21 X |
| 4,388,800 | 6/1983 | Trezeguet et al. | 65/4.2 X |
| 4,551,162 | 11/1985 | Hicks | 65/4.2 |
| 4,682,849 | 7/1987 | Kowata et al. | 65/4.2 X |
| 5,017,206 | 5/1991 | Miller et al. | 65/3.11 |
| 5,185,020 | 2/1993 | Satoh et al. | 65/18.1 X |

FOREIGN PATENT DOCUMENTS

| | | |
|---|---|---|
| 0213856 | 3/1987 | European Pat. Off. . |
| 0372450 | 6/1990 | European Pat. Off. . |
| 0484850 | 5/1992 | European Pat. Off. . |
| WO9014316 | 11/1990 | WIPO . |

*Primary Examiner*—Robert L. Lindsay
*Attorney, Agent, or Firm*—Sughrue, Mion, Zinn, Macpeak & Seas

[57] ABSTRACT

The method of manufacturing a multiferrule for optical fibers, the method consisting in fiber drawing a preform of silica that includes a plurality of mutually parallel channels, the method being characterized by the fact that said preform is made from a rod (1) of silica having a plurality of longitudinal grooves (3) uniformly distributed about an axis (2) and closed by at least one piece of silica (4) for defining said plurality of channels.

4 Claims, 2 Drawing Sheets

METHOD OF MANUFACTURING A MULTIFERRULE FOR OPTICAL FIBERS

The present invention relates to a method of preparing a multiferrule for optical fibers, the method consisting in fiber-drawing a silica preform that comprises a plurality of mutually parallel channels.

Such a method is described in European patent application EP-A-91 118 762.

An object of the present invention is to provide extremely compact multiferrules cheaply that are suitable, in particular, for connecting multiple-core optical fibers.

The present invention provides a method of manufacturing a multiferrule for optical fibers, the method consisting in fiber drawing a preform of silica that includes a plurality of mutually parallel channels, the method being characterized by the fact that said preform is made from a rod of silica having a plurality of longitudinal grooves uniformly distributed about an axis and closed by at least one piece of silica for defining said plurality of channels.

In a first embodiment, said longitudinal grooves are closed by a cylindrical silica tube surrounding said rod and shrunk onto the rod.

Advantageously, at least one peripheral circular groove is formed in said multiferrule, communicating with said channels in order to enable fiber-clamping means to be installed therein.

In a second embodiment, respective silica tubes are inserted in said grooves, thereby defining said channels, and said preform is given a uniform cylindrical shape by applying grains of silica thereto and implementing a filling method using the plasma technique.

The present invention also provides a multiferrule obtained by implementing the above-defined method.

Other features and advantages of the present invention appear from the following description of embodiments given by way of non-limiting illustration. In the accompanying drawings:

FIG. 3A shows a silica rod with longitudinal grooves;

FIG. 3B shows a silica tube;

Figure 1:
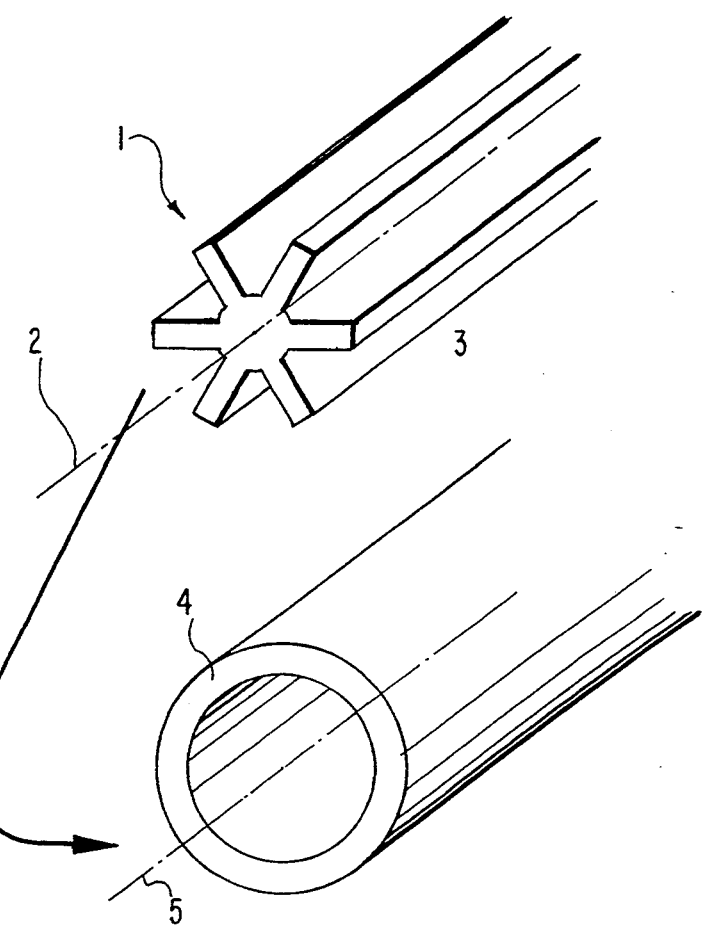
FIG. 1 is a highly diagrammatic exploded perspective view of the elements of a preform used for implementing one example of the method of the invention.
Figure 3A:
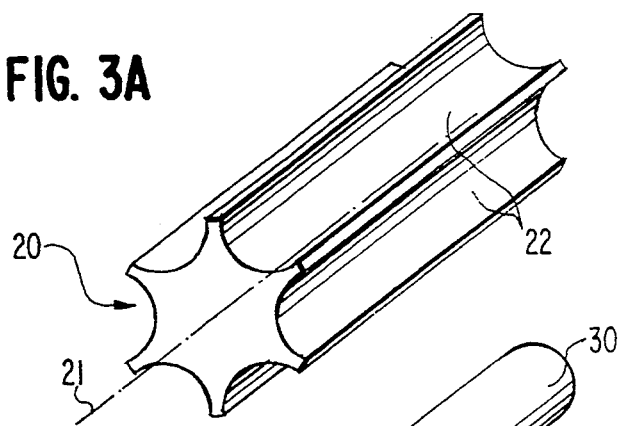
FIGS. 3A to 3D are perspective diagrams of various different elements that arise in implementing another example of the method of the invention.
Figure 3B:
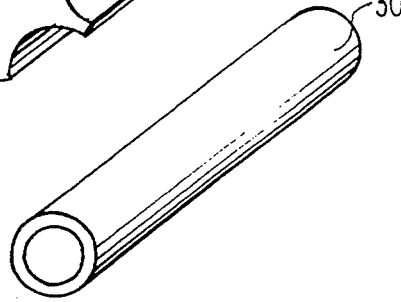
Figure 3C:
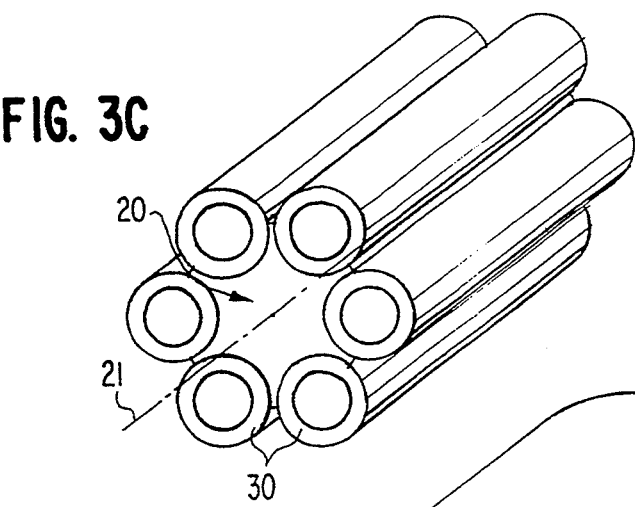
Figure 3D:
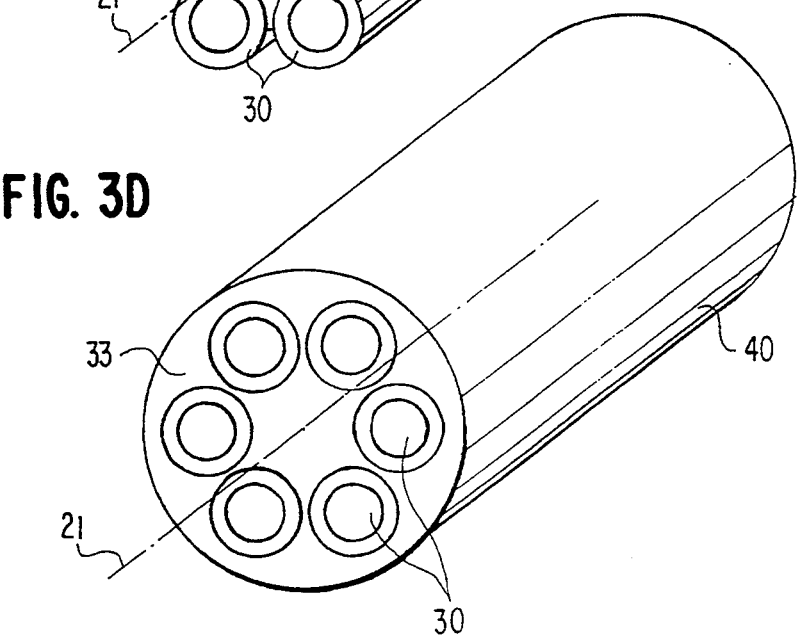

FIG. 3C shows the rod of FIG. 3A associated with a plurality of tubes as shown in FIG. 3B; and FIG. 3D shows the rod of FIG. 3C after being filled with grains of silica by the plasma technique FIG. 1 shows a silica rod 1 about an axis 2 and including six parallel longitudinal grooves 3 that are machined in the form of V-shapes regularly distributed about the axis 2. The maximum outside diameter of the rod is 22 mm. It is 200 mm long. Each groove is 4.5 mm deep.

The rod is inserted into a silica tube 4 having an axis 5, with the axes 2 and 5 substantially coinciding. The inside and outside diameters of the tube are respectively equal to 26 mm and to 30 mm. A shrinking operation is performed so as to obtain a silica preform with six internal channels.

Figure 2:
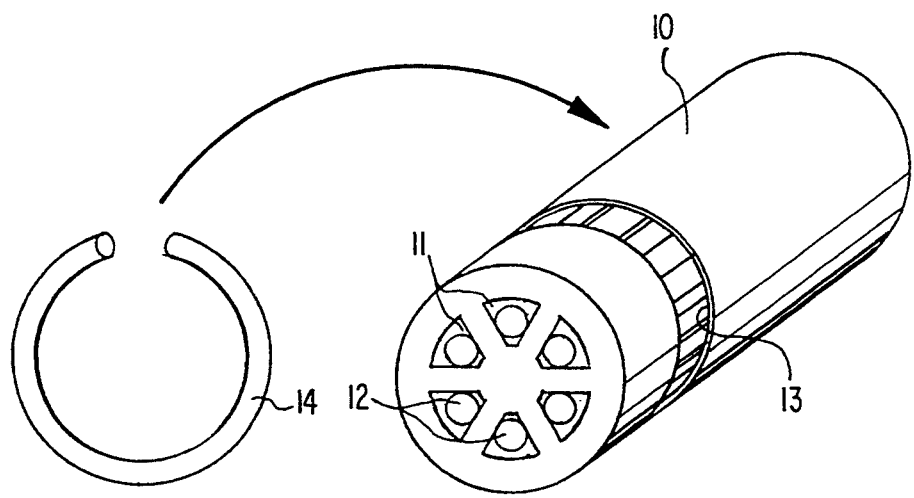
FIG. 2 is a perspective diagram showing an example of a multiferrule obtained from the FIG. 1 preform.

After fiber drawing, a multiferrule 10 is obtained which is shown diagrammatically in FIG. 2 where its channels 11 can be seen. The diameter of the multiferrule is 3 mm. The mean diameter of the channels is 127 $\mu$m, and each of them receives a respective optical fiber 12. A circular groove 13 is provided on the periphery of the multiferrule 10, and it communicates with the channels 11 to enable a clamping ring 14 to be inserted therein and to keep the set of fibers 12 in place.

In a second embodiment, the starting material is a silica rod 20 having an axis 21, the rod being 200 mm long and having six machined longitudinal grooves 6 uniformly distributed about .its axis 21 (see FIG. 3A). The maximum outside diameter of the rod 20 is 20 mm, and the depth of its groove is 3 mm. Silica tubes 30 of 3 mm inside diameter and of 9 mm outside diameter (see FIGS. 3B and 3C) are disposed in said grooves.

Using a conventional method, the assembly shown in FIG. 3C is filled with silica 33 using the plasma technique. By way of example, a method of this kind is described in the article by R. Dorn and C. Le Sergent entitled "Preform technologies for optical fibers" published in Electrical Communication, Vol. 62, No. ¾ - 1988, page 238. This technique is known by the initials ALPD which stand for "Axial and Lateral Plasma Deposition".

The preform obtained in this way is referenced 40 in FIG. 3D. Its outside diameter is 28 mm, for example.

After fiber drawing, about 15 meters of multiferrule is obtained, having an outside diameter of 3 mm and having six channels each with an inside diameter of 127 $\mu$m. It is thus easy to make 150 elements of length 10 cm therefrom, for the purpose of interconnecting optical fibers.

Such a multiferrule is particularly adapted to multiwaveguide fiber connection as described in French patent application No. 92 02 728. Such a fiber may have six light waveguides with an outside diameter of 35 $\mu$m.

Very cheap means is thus made available for implementing a multiferrule for highly compact optical interconnection.

Naturally, the invention is not limited to the embodiments described above. Without going beyond the ambit of the invention, any means may be replaced by equivalent means. In particular, it would be possible to change the dimensions of the preform in order to increase the number of connection elements.

We claim:

1. A method of manufacturing a multiferrule for optical fibers, said method comprising the following steps:

making a preform from a rod of silica having a plurality of longitudinal grooves uniformly distributed about an axis and closed by at least one piece of silica for defining a plurality of mutually parallel preform channels; and fiber drawing said silica preform, that includes said plurality of mutually parallel preform channels, so as to obtain said multiferrule, said multiferrule having channels corresponding to the channels of said preform and having mean dimensions that are slightly greater than an outer diameter of said optical fibers.

2. A method of manufacturing a multiferrule according to claim 1, characterized by the fact that said longitudinal grooves are closed by a cylindrical silica tube (4) surrounding said rod (1) and shrunk onto the rod.

3. A method of manufacturing a multiferrule according to claim 2, characterized by the fact that at least one peripheral circular groove (13) is formed in said multiferrule, communicating with said multiferrules channels (11) in order to enable fiber-clamping means (14) to be installed therein.

4. A method of manufacturing a multiferrule according to claim 1, characterized by the fact that respective silica tubes (30) are inserted in said grooves (22), thereby defining said preform channels, and said preform is given a uniform cylindrical shape by applying grains of silica (33) thereto and implementing a filling method using the plasma technique.

* * * * *